(12) United States Patent
Kim et al.

(10) Patent No.: US 11,862,399 B2
(45) Date of Patent: Jan. 2, 2024

(54) MULTILAYERED ELECTRONIC COMPONENT AND DIELECTRIC COMPOSITION

(71) Applicant: SAMSUNG ELECTRO-MECHANICS CO., LTD., Suwon-si (KR)

(72) Inventors: Kyung Sik Kim, Suwon-si (KR); Jong Hwan Lee, Suwon-si (KR); Jeong Yun Park, Suwon-si (KR); Tae Young Ham, Suwon-si (KR); In Tae Seo, Suwon-si (KR); Jae Sung Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 155 days.

(21) Appl. No.: 17/318,497

(22) Filed: May 12, 2021

(65) Prior Publication Data
US 2022/0208454 A1 Jun. 30, 2022

(30) Foreign Application Priority Data
Dec. 24, 2020 (KR) .................. 10-2020-0183641

(51) Int. Cl.
*H01G 4/12* (2006.01)
*H01G 4/30* (2006.01)
*C04B 35/468* (2006.01)

(52) U.S. Cl.
CPC ....... *H01G 4/1227* (2013.01); *C04B 35/4682* (2013.01); *H01G 4/30* (2013.01);
(Continued)

(58) Field of Classification Search
CPC .... H01G 4/1227; H01G 4/30; C04B 35/4682; C04B 2235/3217; C04B 2235/3236;
(Continued)

(56) References Cited

U.S. PATENT DOCUMENTS

| 2009/0149312 A1* | 6/2009 | Aman ................. C04B 35/4682 501/137 |
| 2013/0083450 A1* | 4/2013 | Yoon .................... H01G 4/1227 361/321.4 |

(Continued)

FOREIGN PATENT DOCUMENTS

| KR | 10-2006-0110603 A | 10/2006 |
| KR | 10-2017-0046341 A | 5/2017 |

OTHER PUBLICATIONS

Y. Furukawa, et al., "Effect of Wettability of Grains by a Liquid Phase on Grain Growth Behavior of La-Doped SrTiO3 Ceramics," Journal of the Ceramic Society of Japan, vol. 104, No. 9, 1996, pp. 900-903.

(Continued)

*Primary Examiner* — Arun Ramaswamy
(74) *Attorney, Agent, or Firm* — Morgan, Lewis & Bockius LLP

(57) ABSTRACT

A multilayer electronic component according to some embodiments of the present disclosure includes: a body including a dielectric layer and an internal electrode alternately disposed with the dielectric layer; and an external electrode disposed on the body, wherein a ratio of the number of dielectric grains having a size of 100 to 250 nm included in the dielectric layer is 55% or more with respect to a total number of the dielectric grains included in the dielectric layer.

17 Claims, 6 Drawing Sheets

(52) U.S. Cl.
CPC ............. *C04B 2235/3217* (2013.01); *C04B 2235/3236* (2013.01); *C04B 2235/3418* (2013.01); *C04B 2235/442* (2013.01); *C04B 2235/785* (2013.01)

(58) Field of Classification Search
CPC ...... C04B 2235/3418; C04B 2235/442; C04B 2235/785
USPC ................. 361/301.4, 321.1, 321.5, 311
See application file for complete search history.

(56) References Cited

U.S. PATENT DOCUMENTS

| | | | |
|---|---|---|---|
| 2016/0168036 A1* | 6/2016 | Hong ............... | C04B 37/001 501/138 |
| 2017/0271082 A1* | 9/2017 | Yoon ............... | H01G 4/228 |
| 2018/0040424 A1* | 2/2018 | Takahashi .......... | C04B 35/64 |
| 2018/0090272 A1* | 3/2018 | Nagaoka ........... | H01G 4/232 |
| 2019/0100465 A1* | 4/2019 | Yoon ............... | B32B 18/00 |

OTHER PUBLICATIONS

Hwi-Yeol Park, et al., "Microstructure and piezoelectric properties of lead-free(1-x)(Na 0.5 K0.5) NbO 3—xCaTIO 3 ceramics," Journal of Applied Physics, No. 102, 2007.

* cited by examiner

MULTILAYERED ELECTRONIC COMPONENT AND DIELECTRIC COMPOSITION

CROSS-REFERENCE TO RELATED APPLICATION(S)

This application claims benefit of priority to Korean Patent Application No. 10-2020-0183641 filed on Dec. 24, 2020, in the Korean Intellectual Property Office, the disclosure of which is incorporated herein by reference in its entirety.

BACKGROUND

1. Field

The present disclosure relates to a multilayer electronic component and a dielectric composition.

2. Description of Related Art

A multilayer ceramic capacitor (MLCC), a type of multilayer electronic component, is a chip type condenser, mounted on the printed circuit boards of various types of electronic products, including image display devices, such as a liquid crystal display (LCD) and a plasma display panel (PDP), a computer, a smartphone, a mobile phone, and the like, serving to charge or discharge electricity.

Such a multilayer ceramic capacitor may be used as a component of various electronic devices due to advantages thereof, such as miniaturization, high capacitance, and ease of mounting. As electronic devices such as computers and mobile devices are miniaturized and implemented with high output, demand for miniaturization and implementation of high capacitance of a multilayer ceramic capacitor are increasing.

In order to achieve miniaturization and high capacitance of the multilayer ceramic capacitor, it is necessary to increase the number of stacked dielectric layers of the dielectric layer and the internal electrodes by reducing the thickness of the dielectric layer and the internal electrodes. Currently, the thickness of the dielectric layer has reached a level of about 0.6 μm, and thinning is being undertaken.

However, as the thickness of the dielectric layer is reduced, a large electric field is applied per unit thickness, and accordingly, problems such as an increase in temperature, an effective capacitance change rate, a decrease in breakdown voltage, and the like, may occur, such that there is a concern to decrease reliability.

In order to solve such problems, a new method, capable of securing high reliability not only in terms of the structure of the multilayer ceramic capacitor but also in terms of the composition of the dielectric, is required.

If a dielectric composition, which may improve reliability at a current level one step further, is secured, a thinner multilayer ceramic capacitor may be manufactured.

SUMMARY

An aspect of the present disclosure is to provide a multilayer electronic component and a dielectric composition having excellent reliability.

An aspect of the present disclosure is to provide a multilayer electronic component and a dielectric composition capable of implementing a uniform abnormal grain growth system.

An aspect of the present disclosure is to provide a multilayer electronic component and a dielectric composition having a reduced dissipation factor (DF) and an effective capacitance change rate.

An aspect of the present disclosure is to provide a multilayer electronic component and a dielectric composition having excellent withstand voltage characteristics and dielectric constant characteristics.

However, the object of the present disclosure is not limited to the above description, and it will be more easily understood in the course of describing specific embodiments of the present disclosure.

According to an aspect of the present disclosure, a dielectric composition includes a $BaTiO_3$-based main component and a first subcomponent, wherein the first subcomponent includes $BaCO_3$ and $SiO_2$, wherein a content of $BaCO_3$ is 4.0 mole % or more, relative to 100 mole of Ti of the main component, and a content of $SiO_2$ is 7.0 mole % or more, relative to 100 mole of Ti of the main component.

According to an aspect of the present disclosure, a multilayer electronic component includes: a body including a dielectric layer and an internal electrode alternately disposed with the dielectric layer; and an external electrode disposed on the body, wherein a ratio of the number of dielectric grains having a size of 100 to 250 nm included in the dielectric layer is 55% or more with respect to a total number of the dielectric grains included in the dielectric layer.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
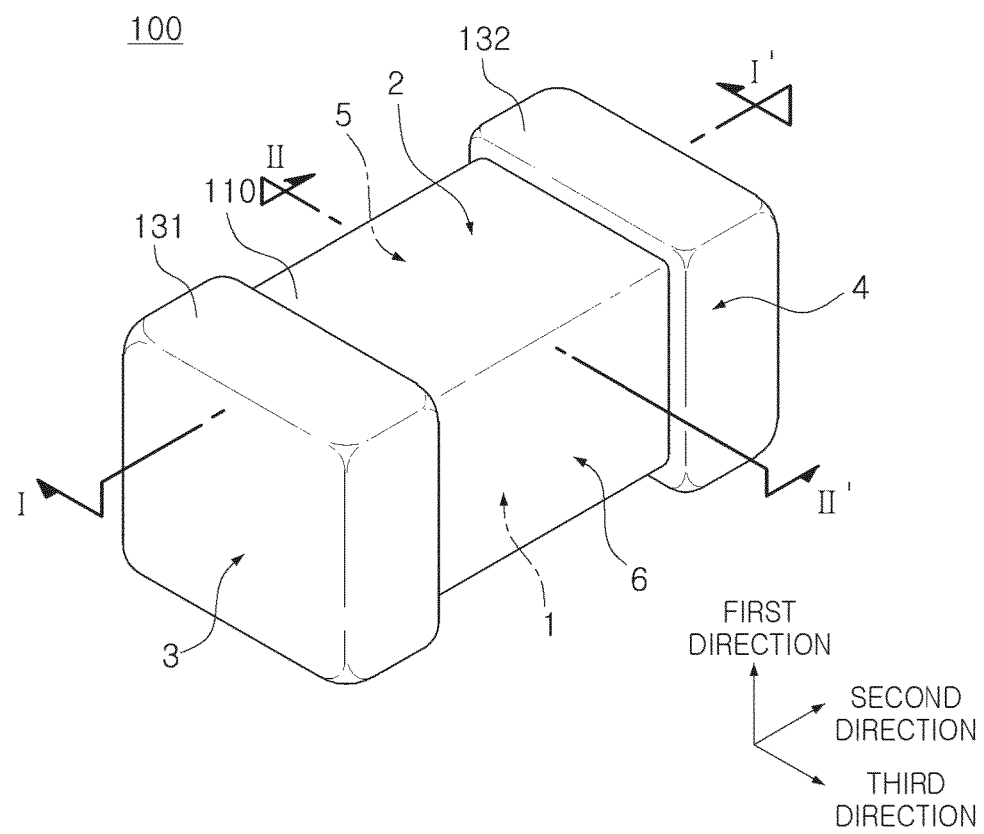
FIG. 1 is a schematic perspective view of a multilayer electronic component according to an embodiment of the present disclosure.

Hereinafter, embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity. Further, in the drawings, elements having the same functions within the same scope of the inventive concept will be designated by the same reference numerals.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may include other components as well, rather than excluding other components, unless specifically stated otherwise.

In the drawings, a first direction may be defined as a stacked direction or a thickness (T) direction, a second direction may be defined as a length (L) direction, and a third direction may be defined as a width (W) direction.

Dielectric Composition

A dielectric composition according to some embodiments of the present disclosure includes a $BaTiO_3$-based main component and a first subcomponent, wherein the first subcomponent includes $BaCO_3$ and $SiO_2$, and a content of $BaCO_3$ is 4.0 mole % or more, relative to 100 mole of Ti of the main component, while a content of $SiO_2$ is 7.0 mole % or more, relative to 100 mole of Ti of the main component.

In general, it is known that an increase in dissipation factor (DF), an increase in effective capacitance change rate, and a decrease in breakdown voltage are due to the distribution of dielectric grain size accompanied by abnormal grain growth.

In addition, it is known that the addition of liquid elements such as $BaCO_3$, $SiO_2$ and the like, induces abnormal grain growth. Therefore, conventionally, it has been common to add a small amount of liquid elements such as $BaCO_3$, $SiO_2$ and the like.

On the other hand, in the present disclosure, by adding a large amount of liquid elements to simultaneously induce abnormal grain growth, a uniform microstructure was secured through uniform grain growth rather than selective growth of some grains due to grain impingement. Accordingly, effects such as a reduction in dissipation factor (DF), a reduction in effective capacitance change rate, and an increase in a breakdown voltage can be secured, thereby improving the reliability of the multilayer electronic component.

According to some embodiments of the present disclosure, by adding 4.0 mole % or more of $BaCO_3$, relative to 100 mole of Ti of the main component, and 7.0 mole % or more of $SiO_2$ to 100 mole of Ti of the main component, a uniform abnormal grain growth system of dielectric grains can be implemented. Accordingly, effects such as a reduction in dissipation factor (DF), a reduction in effective capacitance change rate, and an increase in a breakdown voltage can be secured, thereby improving the reliability of the multilayer electronic component.

Hereinafter, each component of the dielectric composition according to some embodiments of the present disclosure will be described in more detail.

a) Main Component

A dielectric composition according to some embodiments of the present disclosure may include a main component represented by $BaTiO_3$.

According to some embodiments of the present disclosure, the main component may include one or more selected from a group consisting of $BaTiO_3$, $(Ba_{1-x}Ca_x)(Ti_{1-y}Ca_y)O_3$ (where x is 0≤x≤0.3, y is 0≤y≤0.1), $(Ba_{1-x}Ca_x)(Ti_{1-y}Zr_y)O_3$ (where x is 0≤x≤0.3, y is 0≤y≤0.5), and $Ba(Ti_{1-y}Zr_y)O_3$ (where, 0<y≤0.5), but is not necessarily limited thereto.

In particular, when the dielectric layer is thinly formed to a thickness of less than 0.6 µm in accordance with the demand for miniaturization and high capacitance, fine powder of 100 nm or less is generally used. Accordingly, the possibility of the occurrence of abnormal grain growth may increase, and it may be difficult to obtain a uniform microstructure.

However, as described below, when a large amount of liquid elements are added, abnormal grain growth is simultaneously may be induced, such that a uniform microstructure can be secured through uniform grain growth rather than selective growth of some grains due to grain impingement.

Therefore, when an average particle diameter of the main component powder is 100 nm or less, an effect of implementing the uniform grain growth system according to the present disclosure may be more effective.

b) First Subcomponent

According to some embodiments of the present disclosure, the dielectric composition may include $BaCO_3$ and $SiO_2$ as first subcomponent elements, wherein the content of $BaCO_3$ is 4.0 mole % or more, relative to 100 mole of Ti of the main component, and the content of $SiO_2$ is 7.0 mole % or more, relative to 100 mole of Ti of the main component. As excessive amounts of $BaCO_3$ and $SiO_2$, liquid-forming elements, are added, grain growth behavior according to temperature becomes slower, a sintering window may be widened, and abnormal grain growth may be simultaneously induced, such that a uniform microstructure can be secured through uniform grain growth rather than selective growth of some grains due to grain impingement.

Accordingly, a uniform abnormal grain growth system of dielectric grains can be implemented, and effects such as a reduction in dissipation factor (DF), a reduction in effective capacitance change rate, an increase in breakdown voltage, and the like, can be secured, thereby improving the reliability of a multilayer electronic component.

When the content of $BaCO_3$ is less than 4.0 mole %, relative to 100 mole of Ti of the main component, or when the content of $SiO_2$ is less than 7.0 mole %, relative to 100 mole of Ti of the main component, an effect of inducing abnormal grain growth may be insufficient, such that grain impingement may be insufficient, and accordingly it may be difficult to secure a uniform microstructure.

In addition, as $BaCO_3$ and $SiO_2$ satisfy the content range described above, a ratio of the number of dielectric grains having a size of 100 to 250 nm included in the dielectric layer after sintering may be 55% or more with respect to a total number of the dielectric grains included in the dielectric layer.

In some embodiments, the content of $BaCO_3$ may be 4.0 mole % or more and 5.0 mole % or less, relative to 100 mole of Ti of the main component, and the content of $SiO_2$ may be 7.0 mole % or more and 9.5 mole % or less, relative to 100 mole of Ti of the main component. Accordingly, it is possible to secure a high dielectric constant while improving reliability.

When the content of $BaCO_3$ exceeds 5.0 mole %, relative to 100 mole of Ti of the main component, or when the content of $SiO_2$ exceeds 9.5 mole %, relative to 100 mole of Ti of the main component, a more uniform microstructure can be secured, but the dielectric constant may be lowered, which may cause insufficient capacitance in an MLCC.

In addition, as $BaCO_3$ and $SiO_2$ satisfy the content range described above, a ratio of the number of dielectric grains having a size of 100 to 250 nm included in the dielectric layer after sintering may be 55% or more and 65% or less with respect to a total number of the dielectric grains included in the dielectric layer.

Meanwhile, a dielectric constant at room temperature of the dielectric composition according to some embodiments of the present disclosure is not particularly limited, but, for example, the dielectric constant at room temperature may be 2000 or higher.

c) Second Subcomponent

According to some embodiments of the present disclosure, the dielectric composition may include an oxide or carbonate containing at least one of Mn, V, Cr, Fe, Ni, Co, Cu, and Zn as a second subcomponent.

As the second subcomponent, at least one of the oxides or carbonates containing at least one of Mn, V, Cr, Fe, Ni, Co, Cu, and Zn may be included in an amount of 0.1 to 2.0 mole %, relative to 100 moles of Ti of the main component.

The second subcomponent may serve to lower a sintering temperature and improve high-temperature withstand voltage characteristics of the multilayer ceramic capacitor to which the dielectric composition is applied.

The content of the second subcomponent is an amount included, with respect to 100 mole of Ti of the main component, and may be particularly defined as mole of metal ions included in each subcomponent.

When the content of the second subcomponent is lower than 0.1 mole % relative to 100 moles of Ti of the main component, a sintering temperature may increase and the high-temperature withstand voltage characteristics may be slightly decrease.

When the content of the second subcomponent is 2.0 mole % or more relative to 100 moles of Ti of the main component, high-temperature withstand voltage characteristics and room temperature specific resistivity may decrease.

In particular, the dielectric composition according to some embodiments of the present disclosure may include a second subcomponent having a content of 0.1 to 2.0 mole %, relative to 100 mole of the main component, thereby enabling low temperature sintering and obtaining high high-temperature withstand voltage characteristics.

d) third subcomponent

According to some embodiments of the present disclosure, the dielectric ceramic composition may include a third subcomponent including one or more selected from a group of consisting of oxides and carbonates of at least one element of Y, Dy, Ho, Sm, Gd, Er, La, Ce, Tb, Tm, Yb, and Nd.

The third subcomponent may be included in an amount of 4.0 mole % or less, relative to 100 mole of Ti of the main component.

The content of the third subcomponent may be relative to the content of Y, Dy, Ho, Sm, Gd, Er, La, Ce, Tb, Tm, Yb, and Nd included in the third subcomponent, regardless of a form of Y, Dy, Ho, Sm, Gd, Er, La, Ce, Tb, Tm, Yb, and Nd such as oxides or carbonates.

For example, a sum of the contents of elements Y, Dy, Ho, Sm, Gd, Er, La, Ce, Tb, Tm, Yb, and Nd included in the third subcomponent may be 4.0 mole % or less, relative to 100 mole of Ti of the main component.

The third subcomponent may serve to prevent deterioration of the reliability of the multilayer ceramic capacitor to which the dielectric ceramic composition is applied in some embodiments of the present disclosure.

When the content of the third subcomponent exceeds 4.0 mole %, with respect to 100 mole of Ti of the main component, high-temperature withstand voltage characteristics may be deteriorated by generation of a pyrochlore ($RE_2Ti_2O_7$) secondary phase (where RE is an element of at least one element of Y, Dy, Ho, Sm, Gd, Er, La, Ce, or Nd).

e) Fourth Subcomponent

According to some embodiments of the present disclosure, the dielectric composition may include an oxide containing Al as a fourth subcomponent.

The dielectric composition may further include a fourth subcomponent of 0.5 mole % or less, which is an oxide containing Al, relative to 100 mole of Ti as the main component.

A content of the fourth subcomponent may be relative to a content of the element of Al contained in the fourth subcomponent, regardless of a form of addition such as glass, oxide, or carbonate.

The fourth subcomponent may serve to lower a sintering temperature and improve high-temperature withstand voltage characteristics of the multilayer ceramic capacitor to which the dielectric composition is applied.

When the content of the fourth subcomponent exceeds 0.5 mole %, relative to 100 mole of the main component, problems, such as a decrease in sinterability and density, and generation of a secondary phase, may occur, which is not preferable.

Multilayer Electronic Component

FIG. 1 is a schematic perspective view of a multilayer electronic component according to some embodiments of the present disclosure.

Figure 2:
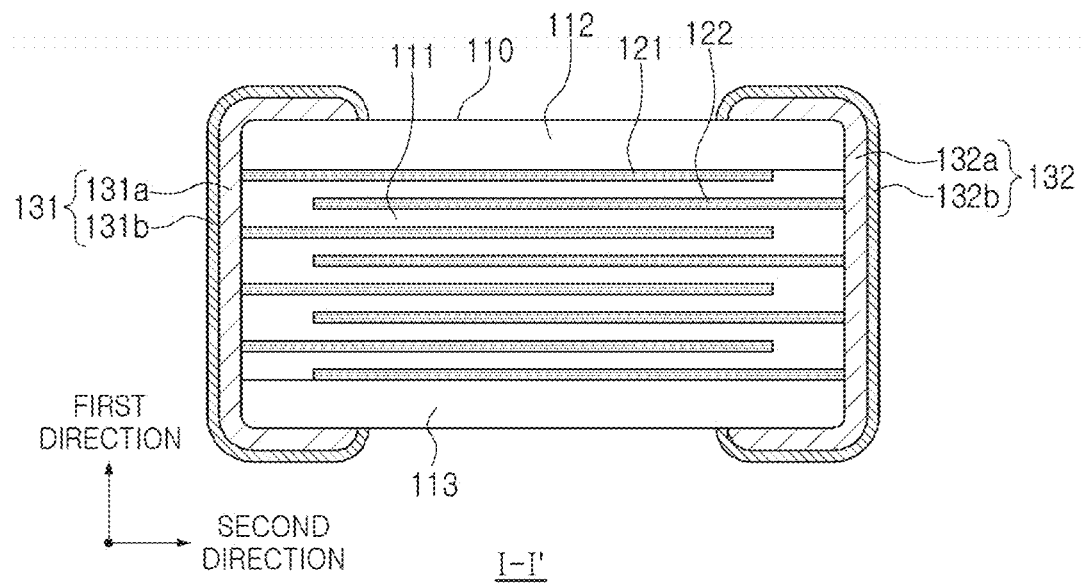
FIG. 2 schematically illustrates a cross-sectional view taken along line I-I' of FIG. 1.

FIG. 2 schematically illustrates a cross-sectional view taken along line I-I' of FIG. 1.

Figure 3:
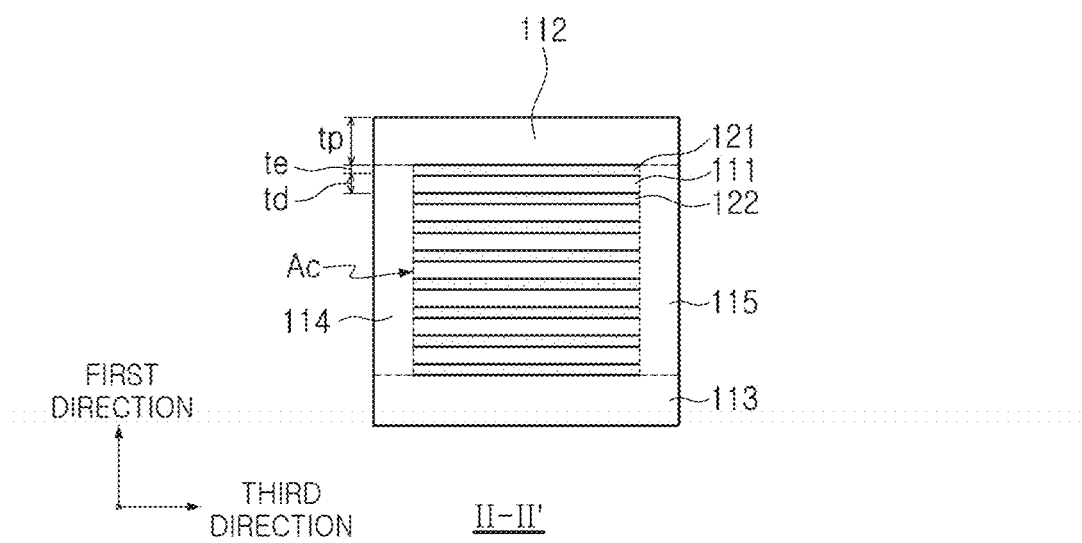
FIG. 3 schematically illustrates a cross-sectional view II-II' of FIG. 1.

FIG. 3 schematically illustrates a cross-sectional view taken along line II-II' of FIG. 1.

Figure 4:
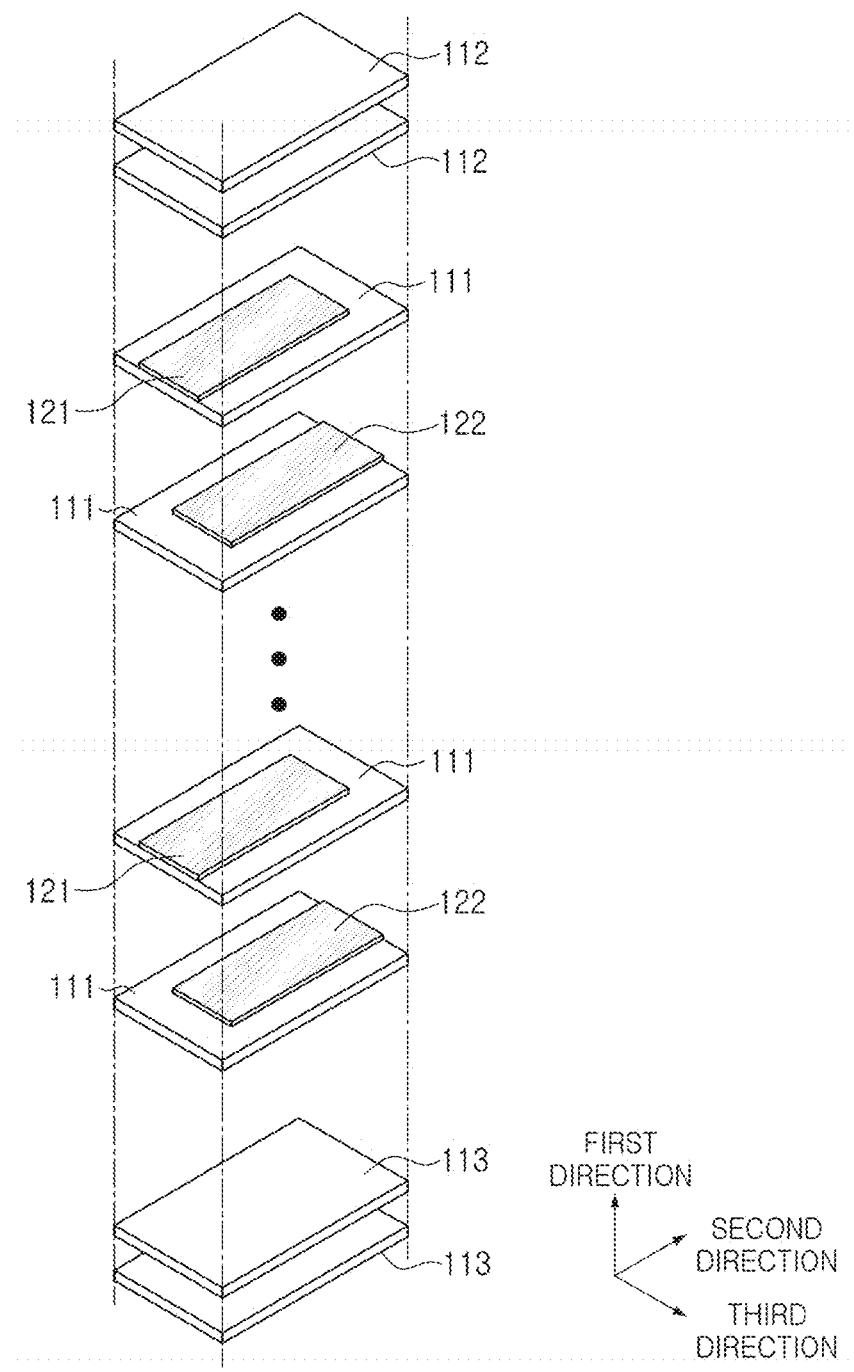
FIG. 4 is an exploded perspective view schematically illustrating a body of a multilayer electronic component according to an embodiment of the present disclosure.

FIG. 4 is an exploded perspective view schematically illustrating a body of a multilayer electronic component according to some embodiments of the present disclosure.

Hereinafter, a multilayer electronic component according to some embodiments of the present disclosure will be described in detail referring to FIGS. 1 to 4. However, portions overlapping with those described in the above-described dielectric composition will be omitted in order to avoid redundant explanations. In addition, a multilayer ceramic capacitor is described as an example of a multilayer electronic component. However, the present disclosure may be applied to various electronic products using the above-described dielectric composition, such as, an inductor, a piezoelectric element, a varistor, a thermistor, or the like.

A multilayer electronic component 100 according to some embodiments of the present disclosure includes a body 110 including a dielectric layer 111 and internal electrodes 121 and 122 alternately disposed with the dielectric layer; and external electrodes 131 and 132 disposed on the body, wherein a ratio of the number of dielectric grains having a size of 100 to 250 nm included in the dielectric layer is 55% or more with respect to a total number of the dielectric grains included in the dielectric layer.

The body 110 is formed such that the dielectric layer 111 and the internal electrodes 121 and 122 are alternately stacked.

The specific shape of the body 110 is not particularly limited, but as illustrated, the body 110 may have a hexahedral shape, or a shape similar thereto. Due to shrinkage of ceramic powder included in the body 110 during a sintering process, the body 110 may have a substantially hexahedral shape, but may not have a hexahedral shape having completely straight lines.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first and second surfaces 1 and 2, connected to the third and fourth surfaces 3 and 4 and opposing each other in a third direction.

The plurality of dielectric layers 111 forming the body 110 are in a sintered state, and a boundary between adjacent dielectric layers 111 may be integrated, such that it may be difficult to confirm without using a scanning electron microscope (SEM).

The dielectric layer 111 may be formed using the above-described dielectric composition.

A ratio of the number of dielectric grains having a size of 100 to 250 nm included in the dielectric layer 111 is 55% or more with respect to the total number of dielectric grains included in the dielectric layer 111. Accordingly, effects such as a reduction in dissipation factor (DF), a reduction in an effective capacitance change rate, and an increase in a breakdown voltage can be secured, thereby improving the reliability of the multilayer electronic component.

If the ratio of the number of dielectric grains in the size of 100 to 250 nm included in the dielectric layer and having is less than 55% with respect to the total number of dielectric grains included in the dielectric layer 111, the microstructure is uneven, and there is a concern that the reliability may be degraded.

A ratio of the number of dielectric grains of a size of 100 to 250 nm may be measured from an image obtained by scanning centers in the first and second directions of the cross-section of the body cut in the first and second directions with a scanning electron microscope (SEM).

Specifically, in an image scanned at 50$k$ magnification using ZEISS's SEM, a distribution of the dielectric grains according to size was analyzed by using a feret diameter of each dielectric grain measured using Zootos, a type of grain size measurement software, as the size of the dielectric grain.

In some embodiments, a ratio of the number of dielectric grains having a size of 100 to 250 nm included in the dielectric layer 111 may be 55% or more and 65% or less with respect to the total number of the dielectric grains included in the dielectric layer. Accordingly, it is possible to secure a high dielectric constant while improving reliability.

When the ratio of the number of dielectric grains of 100 to 250 nm exceeds 65%, there is a concern that the dielectric constant may decrease.

Meanwhile, a thickness td of the dielectric layer 111 needs not be particularly limited.

However, in general, when the dielectric layer is formed thinly to have a thickness of less than 0.6 μm, in particular, when the thickness of the dielectric layer is 0.45 μm or less, there was a concern that reliability may decrease.

As described above, according to some embodiments of the present disclosure, effects such as a reduction in dissipation factor (DF), a reduction in effective capacity change rate, and an improvement in breakdown voltage can be secured, even when the thickness of the dielectric layer 111 is 0.45 μm or less, excellent reliability can be secured.

Therefore, when the thickness of the dielectric layer 111 is 0.45 μm or less, the reliability improvement effect according to the present embodiment may be more remarkably improved.

The thickness td of the dielectric layer 111 may refer to an average thickness of the dielectric layer 111 disposed between the first and second internal electrodes 121 and 122.

The average thickness of the dielectric layer 111 may be measured by scanning an image of the length direction—the thickness direction (L-T cross-section) of the body 110 with a scanning electron microscope (SEM).

For example, with regard to an arbitrary dielectric layer extracted from the image obtained by scanning the cross-section in the first and second directions (length and thickness directions) of the body 110 cut in a central portion in the third direction (width direction) with a scanning electron microscope (SEM), an average value of the internal electrodes 121 and 122 may be measured by measuring the thickness thereof at 30 points having equal intervals in the third direction.

The 30 points having equal intervals may be measured at the capacitance formation portion A, meaning a region in which the internal electrodes 121 and 122 overlap each other.

The body 110 may include a capacitance formation portion A disposed in the body 110 and including a first internal electrode 121 and a second internal electrode 122 disposed to oppose each other with the dielectric layer 111 interposed therebetween and having capacitance formed therein and cover portions 112 and 113 formed in upper and lower portions of the capacitance formation portion A.

In addition, the capacitance formation portion A is a portion serving to contribute to capacitance formation of the capacitor, and may be formed by repeatedly laminating a plurality of first and second internal electrodes 121 and 122 with a dielectric layer 111 interposed therebetween.

The cover portions 112 and 113 may include an upper cover portion 112 disposed above the capacitance formation portion A in the first direction, and a lower cover portion 113 disposed below the capacitance formation portion A in the first direction.

The upper cover portion 112 and the lower cover portion 113 may be formed by laminating a single dielectric layer or two or more dielectric layers on the upper and lower surfaces of the capacitance formation portion A in a thickness direction, respectively, and the upper cover portion 112 and the lower cover portion 113 may serve to basically prevent damage to the internal electrodes due to physical or chemical stress.

The upper cover portion 112 and the lower cover portion 113 may not include internal electrodes, and may include the same material as that of the dielectric layer 111.

That is, the upper cover portion 112 and the lower cover position 113 may include a ceramic material, for example, a barium titanate ($BaTiO_3$)-based ceramic material.

Meanwhile, the thickness of the cover portions 112 and 113 need not be particularly limited. However, the thickness tp of the cover portions 112 and 113 may be 20 μm or less in order to more easily achieve miniaturization and high capacitance of the multilayer electronic component.

In addition, margin portions 114 and 115 may be disposed on a side surface of the capacitance formation portion A.

The margin portions may include a margin portion 114 disposed on the sixth surface 6 of the body 110 and a margin portion 115 disposed on the fifth surface 5 of the body 110. That is, the margin portions 114 and 115 may be disposed on both side surfaces of the body 110 in a width direction.

The margin portions 114 and 115 may mean regions between an interface of both ends of the first and second internal electrodes 121 and the body 110 in a cross-section of the body 110 in a width-thickness (W-T) direction, as shown in FIG. 3.

The margin portions 114 and 115 may basically serve to prevent damages to the internal electrodes due to physical or chemical stresses.

The margin portions 114 and 115 may be formed by applying a conductive paste onto the ceramic green sheet to form an internal electrode, except where margin portions are to be formed.

In addition, in order to suppress a step by the internal electrodes 121 and 122, after the internal electrodes are cut so as to be exposed to the fifth and sixth surfaces 5 and 6 of the body after lamination, the margin portions 114 and 115 may also be formed by laminating a single dielectric layer or two or more dielectric layers on both side surfaces of the capacitance formation portion A in the width direction (third direction).

The internal electrodes 121 and 122 are alternately laminated.

The internal electrodes may include first and second internal electrodes 121 and 122. The first and second internal electrodes 121 and 122 may be alternately disposed to oppose each other with the dielectric layer 111 constituting the body 110 interposed therebetween, and may be exposed to the third and fourth surfaces 3 and 4 of the body 110, respectively.

Referring to FIG. 2, the first internal electrode 121 may be spaced apart from the fourth surface 4 and exposed through the third surface 3, and the second internal electrode 122 may be spaced apart from the third surface 3 and exposed through the fourth surface 4.

In this case, the first and second internal electrodes 121 and 122 may be electrically separated from each other by a dielectric layer 111 disposed in the middle.

Referring to FIG. 4, the body 110 may be formed by alternately laminating a ceramic green sheet on which the first internal electrode 121 is printed and a ceramic green sheet on which the second internal electrode 122 is printed, and then sintering.

A material forming the internal electrodes 121 and 122 is not particularly limited, but a material having excellent electrical conductivity may be used. For example, it may be formed by printing a conductive paste for internal electrodes containing at least one or more of palladium (Pd), nickel (Ni), copper (Cu), or alloys thereof on a ceramic green sheet.

In addition, the internal electrodes 121 and 122 may be formed by printing a conductive paste for internal electrodes including one or more of nickel (Ni), copper (Cu palladium (Pd) Ter (kg), gold (Au), platinum (Pt), tin (S tungsten (W), titanium (Ti), or alloys thereof on a ceramic green sheet. The conductive paste for internal electrodes may be formed by a screen printing method or a gravure printing method, but the present disclosure is not limited thereto.

Meanwhile, the thickness to of the internal electrodes may need not to particularly limited.

However, in general, when the internal electrode is formed to have a thickness of less than 0.6 µm, in particular, when the thickness of the internal electrode is 0.45 µm or less, there is a concern that reliability may decrease.

As described above, according to some embodiments of the present disclosure, since effects such as a reduction in dissipation factor (DF), a reduction in effective capacitance change rate, an improvement in breakdown voltage, and the like can be secured, even when the thickness of the internal electrodes 121 and 122 is 0.45 µm less, excellent reliability can be secured.

Therefore, when the thickness of the internal electrodes 121 and 122 is 0.45 µm or less, the effect according to the present disclosure may be more remarkably improved, and miniaturization and high capacitance of the multilayer electronic component may be more easily achieved.

The thicknesses to of the internal electrodes 121 and 122 may mean an average thickness of the first and second internal electrodes 121 and 122.

The average thickness of the internal electrodes 121 and 122 may be measured by scanning an image of a cross-section in the length and thickness direction (L-T) of the body 110 with a scanning electron microscope (SEM).

For example, with regard to arbitrary first and second internal electrodes 121 and 122 extracted from the image obtained by scanning the third direction—the first direction cross-section (W-T cross-section) of the body 110 cut in a central portion in the second direction (L direction) with a scanning electron microscope (SEM), an average value of the internal electrodes 121 and 122 may be measured by measuring the thickness thereof at 30 points having equal intervals in the third direction.

The 30 points having equal intervals may be measured at the capacitance formation portion A, meaning a region in which the internal electrodes 121 and 122 overlap each other.

External electrodes 131 and 132 are disposed in the body 110 and connected to the internal electrodes 121 and 122.

The external electrodes 131 and 132 may be respectively disposed on the third and fourth surfaces 3 and 4 of the body 110, and may include first and second external electrodes 131 and 132 respectively connected to the first and second internal electrodes 121 and 122.

Referring to FIG. 1, the external electrodes 131 and 132 may be disposed to cover both end surfaces of the side margin portions 114 and 115, respectively, in the second direction.

In the present embodiment, a structure in which the multilayer electronic component 100 has two external electrodes 131 and 132 is described, but the number or shape of the external electrodes 131 and 132 may be changed according to the shape of the internal electrodes 121 and 122 or other purposes.

Meanwhile, the external electrodes 131 and 132 may be formed using any material such as metal, or the like, as long as they have electrical conductivity, and a specific material may be determined in consideration of electrical characteristics, structural stability, and the like, and further may have a structure having multi-layers.

For example, the external electrodes 131 and 132 may include electrode layers 131a and 132a disposed in the body 110 and plating layers 131b and 132b formed on the electrode layers 131a and 132a.

More specifically with respect to the electrode layers 131a and 132a, for example, the electrode layers 131a and 132a may be sintered electrodes including a conductive metal or glass, or a resin-based electrode including a conductive metal and a resin.

In addition, the electrode layers 131a and 132a may be formed in such a manner that a sintered electrode and a resin-based electrode are sequentially formed on the body. In addition, the electrode layers 131a and 132a may be formed by transferring a sheet including a conductive metal onto a body, or may be formed by transferring a sheet including a conductive metal onto a sintering electrode.

A material having excellent electrical conductivity may be used as the conductive metal included in the electrode layers 131a and 132a, and it is not particularly limited. For example, the conductive metal may include one or more of nickel (Ni), copper (Cu), or alloys thereof.

The plating layers 131b and 132b may serve to improve mounting characteristics. The type of the plating layers 131b and 132b is not particularly limited, and may be a plating layer including at least one of Ni, Sn, Pd or alloys thereof, and may be formed of a plurality of layers.

For a more specific example of the plating layers 131b and 132b, the plating layers 131b and 132b may be a Ni plating layer or an Sn plating layer, and may have a form in which a Ni plating layer and an Sn plating layer are sequentially formed on the electrode layers 131a and 132a, and may have a form in which the Sn plating layer, the Ni plating layer, and the Sn plating layer are sequentially formed. In addition, the plating layers 131b and 132b may also include a plurality of Ni plating layers and/or a plurality of Sn plating layers.

A size of the multilayer electronic component 100 needs not be particularly limited.

However, in order to achieve miniaturization and high capacitance at the same time, since it is necessary to increase the number of stacked dielectric layers by reducing the thickness of the dielectric layer and the internal electrode, in the multilayer electronic component 100 having a size of 0402 (a length×a width, 0.4 mm×0.2 mm) or less, the reliability and an insulation resistance improvement effect according to the present disclosure may be more remarkably improved.

Accordingly, when the length of the multilayer electronic component 100 is 0.44 mm or less and the width is 0.22 mm or less, considering manufacturing errors and sizes of external electrodes, and the like, a reliability improvement effect according to the present disclosure may be more remarkably improved. Here, the length of the multilayer electronic component 100 may refer to the maximum size of the multilayer electronic component 100 in the second direction, and the width of the multilayer electronic component 100 may refer to the maximum size of the multilayer electronic component 100 in the third direction.

Example

In Example of the present disclosure, a dielectric composition containing barium titanate ($BaTiO_3$) as a main component, and having a content of $BaTiO_3$ and $SiO_2$ as shown in Table 1, relative to 100 mole of Ti as the main component, was prepared, and then a proto-type multilayer ceramic capacitor (MLCC) in which a dielectric layer is formed using a ceramic green sheet including the dielectric composition, was prepared.

A dielectric constant, a DF, and an effective capacitance change rate were measured for Test Nos. 1 to 4, which are specimens of the proto-type multilayer ceramic capacitor (MLCC) completed as described above, were shown in Table 1 below.

The effective capacitance and DF are values measured using a measuring device, and the dielectric constant is a value converted into a dielectric thickness and a dielectric grain size.

TABLE 1

| Test number | $BaCO_3$ (mole %) | $SiO_2$ (mole %) | Dielectric constant | DF(%) | Effective capacitance change rate (%) | |
|---|---|---|---|---|---|---|
| | | | | | 1 Vdc | 3 Vdc |
| 1* | 2.0 | 4.0 | 4250 | 6.39 | −16.1 | −59.9 |
| 2 | 4.0 | 7.0 | 3250 | 4.61 | −7.9 | −47.5 |

TABLE 1-continued

| Test number | $BaCO_3$ (mole %) | $SiO_2$ (mole %) | Dielectric constant | DF(%) | Effective capacitance change rate (%) | |
|---|---|---|---|---|---|---|
| | | | | | 1 Vdc | 3 Vdc |
| 3 | 5.0 | 9.5 | 2000 | 2.65 | −2.1 | −24.6 |
| 4 | 7.0 | 11.0 | 1300 | 1.78 | −1.5 | −15.9 |

(*comparative example)

In the case of Test No. 1, the content of $BaCO_3$ was less than 4.0 mole %, and the content of $SiO_2$ was less than 7.0 mole %, so that it can be seen that the DF and effective capacitance change rate is large and thus reliability is deteriorated.

On the other hand, in the case of Test Nos. 2 to 4, it can be seen that the content of $BaCO_3$ is 4.0 mole % or more, and the content of $SiO_2$ is 7.0 mole % or more, so that the DF and effective capacitance change rate are low and reliability is excellent.

However, in the case of Test No. 4, the dielectric constant was slightly low at 1300. Therefore, in order to improve reliability and secure a high dielectric constant, it may be desirable that the content of $BaCO_3$ is 4.0 mole % or more and 5.0 mole % or less, relative to 100 mole of Ti of the main component, and the content of $SiO_2$ is 7.0 mole % or more and 9.5 mole % or less, relative to 100 mole of Ti of the main component.

Figure 5:
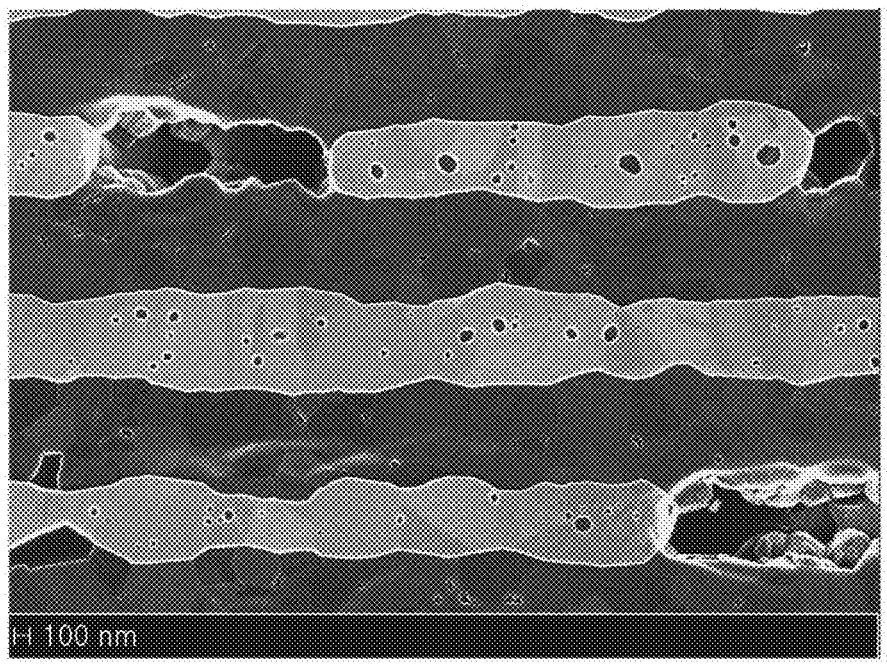
FIG. 5 is an image obtained by scanning a cross-section of a dielectric layer of Test No. 1 by scanning a scanning electron microscope (SEM)
Figure 6:
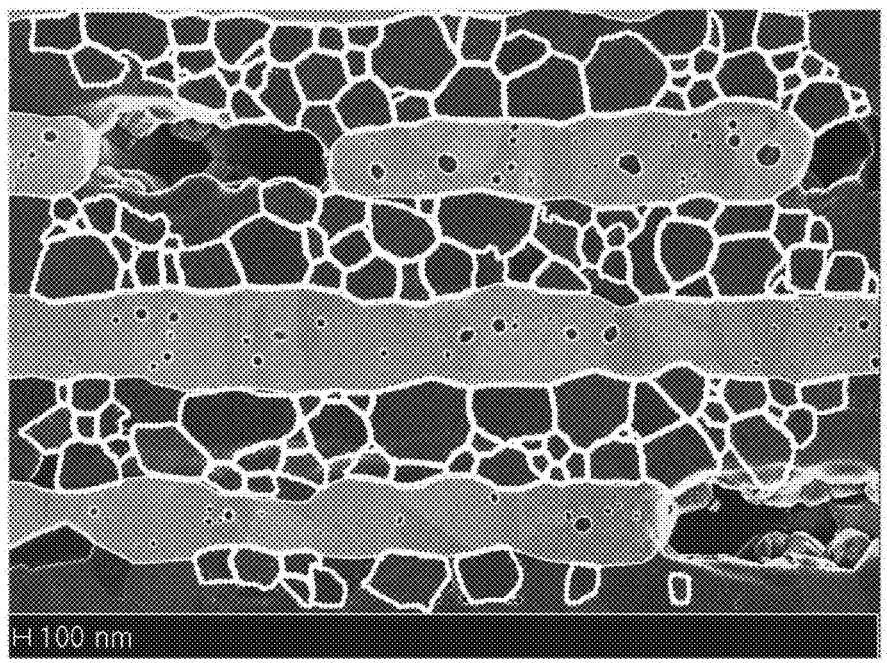
FIG. 6 is a photograph of measuring a feret diameter of each dielectric grain of Test No. 1 using Zootos, which is a particle diameter measurement software.

FIG. 5 shows an image of a sample chip of Test No. 1 scanned at 50 k magnification using a SEM of a ZEISS company in the central portion in the first and second directions of a cross-section cut in the first and second directions from the center in the third direction. FIG. 6 is a photograph of measuring a feret diameter of each dielectric grain of Test No. 1 using Zootos, which is a particle diameter measurement software, and FIG. 7 is a graph of analyzing a distribution of dielectric grains of Test No. 1 according to size using the feret diameter of each dielectric grain measured using Zootos as the size of the dielectric grain.

Figure 7:
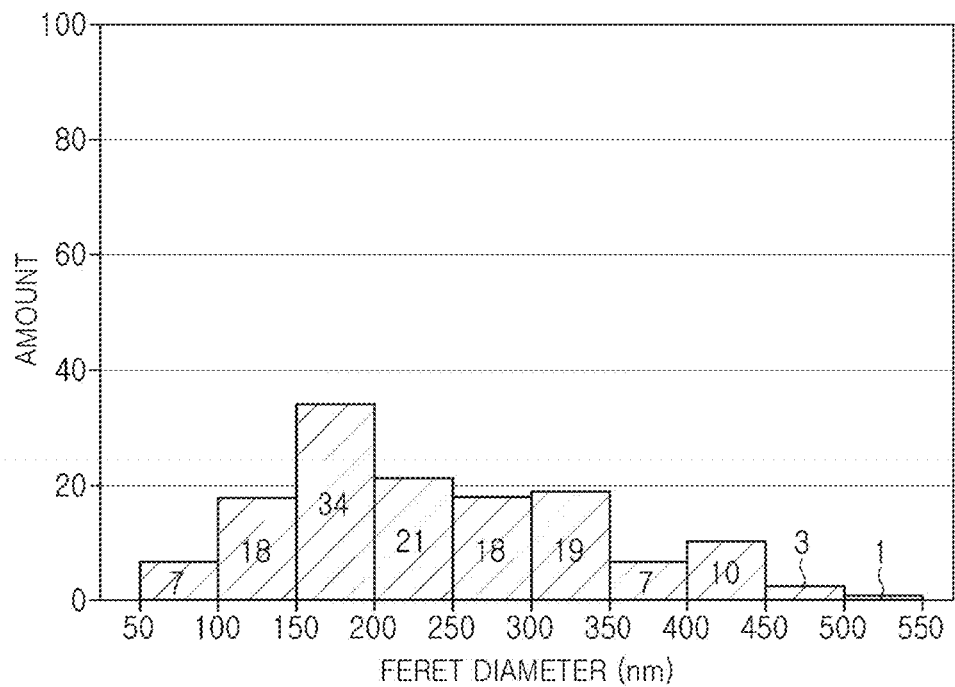
FIG. 7 is a graph illustrating the size distribution of dielectric grains of Test No. 1.
Figure 8:
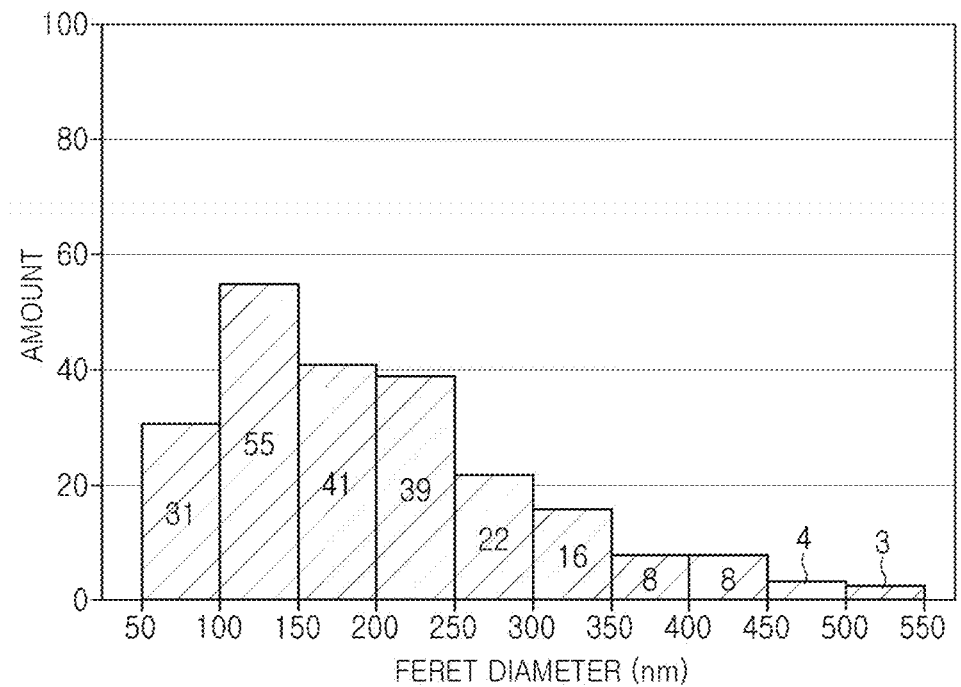
FIG. 8 is a graph illustrating the size distribution of dielectric grains of Test No. 2.
Figure 9:
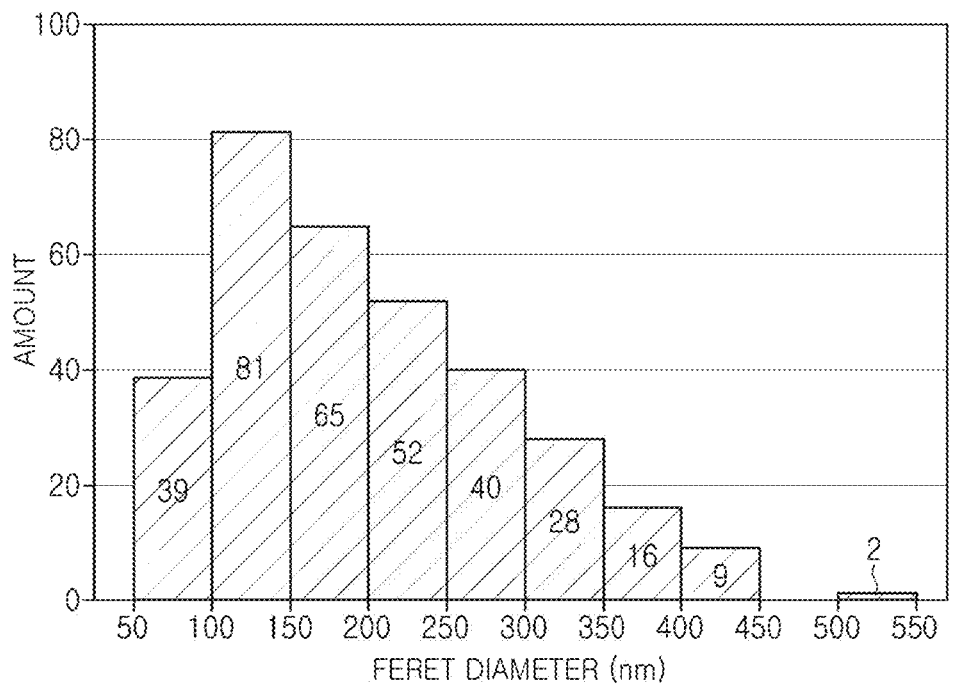
FIG. 9 is a graph illustrating the size distribution of dielectric grains of Test No. 3.
Figure 10:
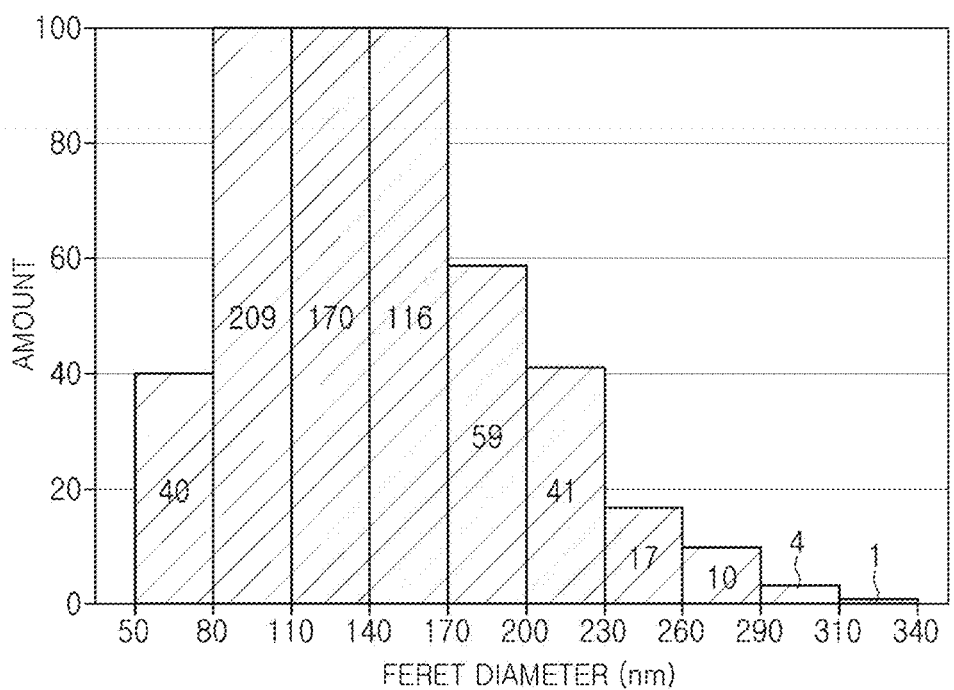
FIG. 10 is a graph illustrating the size distribution of dielectric grains of Test No. 4.

FIGS. 8 to 10 are graphs analyzing the distribution of dielectric grains according to size for Test Nos. 2 to 4, respectively, and are graphs obtained by analyzing the same method as in FIG. 7.

Referring to FIGS. 7 to 10, it can be seen that the size distribution of dielectric grains gradually becomes uniform and smaller as the content of $BaCO_3$ and $SiO_2$ increase.

In addition, in summary with the results in Table 1 above, it can be seen that when a ratio of the number of dielectric grains having a size of 100 to 250 nm included in the dielectric layer is 55% or more with respect to a total number of the dielectric grains included in the dielectric layer, the dielectric composition exhibits improved reliability.

In addition, when the ratio of the number of dielectric grains having a size of 100 to 250 nm included in the dielectric layer is 55% or more with respect to a total number of the dielectric grains included in the dielectric layer, it can be confirmed that a high dielectric constant can be secured while improving reliability.

As set forth above, according to some embodiments of the present disclosure, as one of various effects of the present disclosure, the reliability of the multilayer electronic component and the dielectric composition can be improved.

While the exemplary embodiments have been shown and described above, it will be apparent to those skilled in the art that modifications and variations could be made without departing from the scope of the present disclosure as defined by the appended claims.

What is claimed is:

1. A multilayer electronic component, comprising:
a body including a dielectric layer and an internal electrode alternately disposed with the dielectric layer; and
an external electrode disposed on the body,
wherein a ratio of a number of dielectric grains having a size of 100 to 250 nm included in the dielectric layer is 55% or more with respect to a total number of the dielectric grains included in the dielectric layer,
wherein the dielectric layer comprises a dielectric composition including a $BaTiO_3$-based main component and a first subcomponent,
wherein the first subcomponent comprises $BaCO_3$ and $SiO_2$, and
wherein a content of $BaCO_3$ is 4.0 mole % or more, relative to 100 mole of Ti of the main component, or a content of $SiO_2$ is 7.0 mole % or more, relative to 100 mole of Ti of the main component.

2. The multilayer electronic component of claim 1, wherein the ratio of the number of dielectric grains having a size of 100 to 250 nm included in the dielectric layer is 55% or more and 65% or less with respect to a total number of the dielectric grains included in the dielectric layer.

3. The multilayer electronic component of claim 2, wherein both the content of $BaCO_3$ is 4.0 mole % or more and 5.0 mole % or less, relative to 100 mole of Ti of the main component, and the content of $SiO_2$ is 7.0 mole % or more and 9.5 mole % or less, relative to 100 mole of Ti of the main component.

4. The multilayer electronic component of claim 1, wherein the dielectric composition further comprises a second subcomponent, and
wherein the second subcomponent comprises an oxide or carbonate containing at least one of Mn, V, Cr, Fe, Ni, Co, Cu, or Zn in a content of 0.1 to 2.0 mole %, relative to 100 mole of Ti of the main component.

5. The multilayer electronic component of claim 4, wherein the dielectric composition further comprises a third subcomponent, and
wherein the third subcomponent comprises at least one element of Y, Dy, Ho, Sm, Gd, Er, La, Ce, Tb, Tm, Yb, or Nd in an amount of 4.0 mole % or less, relative to 100 mole of Ti of the main component.

6. The multilayer electronic component of claim 5, wherein the dielectric composition comprises a fourth subcomponent, and
wherein the fourth subcomponent comprises an oxide including Al in an amount of 0.5 mole % or less, relative to 100 mole of Ti of the main component.

7. The multilayer electronic component of claim 1, wherein the dielectric layer has an average thickness of 0.45 µm or less.

8. The multilayer electronic component of claim 1, wherein the internal electrode has an average thickness of 0.45 µm or less.

9. A dielectric composition, comprising:
a $BaTiO_3$—based main component and a first subcomponent,
wherein the first subcomponent comprises $BaCO_3$ and $SiO_2$,
wherein a content of $BaCO_3$ is 4.0 mole % or more, relative to 100 mole of Ti of the main component, and
wherein a content of $SiO_2$ is 7.0 mole % or more, relative to 100 mole of Ti of the main component.

10. The dielectric composition of claim 9, wherein the content of $BaCO_3$ is 4.0 mole % or more and 5.0 mole % or less, relative to 100 mole of Ti of the main component, and
wherein the content of $SiO_2$ is 7.0 mole % or more and 9.5 mole % or less, relative to 100 mole of Ti of the main component.

11. The dielectric composition of claim 9, wherein an average particle diameter of the main component is 100 nm or less.

12. The dielectric composition of claim 9, wherein the dielectric composition further comprises a second subcomponent, and
wherein the second subcomponent comprises an oxide or a carbonate including at least one of Mn, V, Cr, Fe, Ni, Co, Cu, or Zn in a content of 0.1 to 2.0 mole %, relative to 100 mole of Ti of the main component.

13. The dielectric composition of claim 12, wherein the dielectric composition further comprises a third subcomponent, and
wherein the third subcomponent comprises at least one element of Y, Dy, Ho, Sm, Gd, Er, La, Ce, Tb, Tm, Yb or Nd in a content of 4.0 mole % or less, relative to 100 mole of Ti of the main component.

14. The dielectric composition of claim 13, wherein the dielectric composition further comprises a fourth subcomponent, and
wherein the fourth subcomponent comprises an oxide including Al in a content of 0.5 mole % or less, relative to 100 mole of Ti of the main component.

15. A multilayer electronic component, comprising:
a body including a dielectric layer and an internal electrode alternately disposed with the dielectric layer; and
an external electrode disposed on the body,
wherein the dielectric layer comprises a dielectric composition including a $BaTiO_3$-based main component and a first subcomponent,
wherein the first subcomponent comprises $BaCO_3$ and $SiO_2$,
wherein a content of $BaCO_3$ is 4.0 mole % or more, relative to 100 mole of Ti of the main component, and
wherein a content of $SiO_2$ is 7.0 mole % or more, relative to 100 mole of Ti of the main component.

16. The multilayer electronic component of claim 15, wherein a ratio of a number of dielectric grains having a size of 100 to 250 nm included in the dielectric layer is 55% or more with respect to a total number of the dielectric grains included in the dielectric layer.

17. The multilayer electronic component of claim 15, wherein a ratio of a number of dielectric grains having a size of 100 to 250 nm included in the dielectric layer is 55% or more and 65% or less with respect to a total number of the dielectric grains.

* * * * *